(12) United States Patent
Turgeon et al.

(10) Patent No.: US 12,172,745 B2
(45) Date of Patent: Dec. 24, 2024

(54) ENERGY ATTENUATING AIRCRAFT WINDSHIELD CORNER SUPPORTS, SYSTEMS AND METHODS

(71) Applicant: Textron Innovations Inc., Providence, RI (US)

(72) Inventors: Francis Turgeon, Laval (CA); Anthony Dionne, Saint-Hippolyte (CA); Sebastien Duval, Terrebonne (CA)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/052,065

(22) Filed: Nov. 2, 2022

(65) Prior Publication Data
US 2024/0140586 A1 May 2, 2024

(51) Int. Cl.
*B64C 1/14* (2006.01)
*B64C 27/04* (2006.01)
*B64D 45/00* (2006.01)

(52) U.S. Cl.
CPC ............ *B64C 1/1492* (2013.01); *B64C 27/04* (2013.01); *B64D 2045/0095* (2013.01)

(58) Field of Classification Search
CPC ................ B64C 1/1476; B64C 1/1492; B64D 2045/0095; B60J 1/2094; B60J 1/2097; B60J 1/008
See application file for complete search history.

(56) References Cited

U.S. PATENT DOCUMENTS

| | | | | |
|---|---|---|---|---|
| 2,447,059 | A * | 8/1948 | Eaton, Jr. ............... | B64C 1/1476 244/121 |
| 4,352,316 | A * | 10/1982 | Medlin .................... | F41H 7/044 442/244 |
| 5,709,407 | A * | 1/1998 | Stephens ................ | B60R 13/025 296/187.05 |
| 9,550,580 | B2 * | 1/2017 | Sumner ................... | B64D 45/00 |
| 2013/0043348 | A1 * | 2/2013 | Milliere ................. | B64C 1/1492 156/91 |
| 2013/0091779 | A1 * | 4/2013 | Dominique .............. | B60J 1/008 52/1 |
| 2019/0185179 | A1 * | 6/2019 | Tho ........................ | B64C 1/1484 |
| 2020/0385099 | A1 * | 12/2020 | Chaveron ............. | B64C 1/1492 |

OTHER PUBLICATIONS

Federal Aviation Administration, "Rotorcraft Bird Strike Working Group Recommendations to the Aviation Rulemaking Advisory Committee (ARAC)," Nov. 10, 2017, Rev. B May 8, 2019, 120 Pages.

* cited by examiner

*Primary Examiner* — Richard Green
*Assistant Examiner* — Nevena Aleksic
(74) *Attorney, Agent, or Firm* — Fogarty LLP

(57) ABSTRACT

In an aircraft, the airframe includes a windshield frame, with an energy attenuating windshield corner support extending across a corner of the windshield frame. The energy attenuating windshield corner support is configured to deform upon an impact to a windshield disposed in the windshield frame. This energy attenuating windshield corner support may be shaped and/or sized to enable, and/or comprised of a material that enables, the aircraft windshield corner support to deform upon the impact to the windshield disposed in the windshield frame, attenuating energy of the impact to the windshield disposed in the windshield frame.

18 Claims, 10 Drawing Sheets

ENERGY ATTENUATING AIRCRAFT WINDSHIELD CORNER SUPPORTS, SYSTEMS AND METHODS

TECHNICAL FIELD

The present disclosure relates generally to aircraft, more particularly to a windshield assembly for an aircraft, and relates specifically to energy attenuating windshield corner supports, systems and methods for aircraft, such as rotorcraft.

BACKGROUND

A bird strike (birdstrike), or bird aircraft strike hazard (BASH), is a collision between an airborne animal, usually a bird or bat, and an aircraft. Bird strikes are a significant threat to flight safety and can lead to human casualties. The energy that must be absorbed from a 4-pound bird colliding with an aircraft at 135 mph is approximately 10,000 ft-lbs. Such a bird strike can lead to penetration of the windshield of the aircraft and injury to the flight crew.

Compliance to bird strike requirements is typically mandated in various jurisdictions and/or by various (governmental) bodies. For example, in the U.S., current Federal Aviation Administration (FAA) regulations for rotorcraft are mandated in Part 29 rotorcraft (14 CFR § 29.631) and may be similarly imposed on future Part 27 rotorcraft to improve aircraft safety. 14 CFR § 29.631 requires:

The rotorcraft must be designed to ensure capability of continued safe flight and landing (for Category A) or safe landing (for Category B) after impact with a 2.2-lb (1.0 kg) bird when the velocity of the rotorcraft (relative to the bird along the flight path of the rotorcraft) is equal to VNE (never exceed speed) or VH (maximum speed in level flight at maximum continuous power) (whichever is the lesser) at altitudes up to 8,000 feet. Compliance must be shown by tests or by analysis based on tests carried out on sufficiently representative structures of similar design.

Such regulations, and the like, evolve over time. For example, the FAA has assigned the Aviation Rulemaking Advisory Committee (ARAC) to provide recommendations regarding bird strike protection rulemaking, policy, and guidance for normal category rotorcraft, to evaluate existing bird strike protection standards for transport category rotorcraft, and to provide recommendations for enhancement. To this end, the ARAC established the Rotorcraft Bird Strike Working Group (RBSWG) to provide advice and recommendations to the ARAC on bird strike protection rulemaking, policy, and guidance for not only part 27, but also part 29, rotorcraft (14 CFR §§ 27, et seq. and 29, et seq.) See for example, *Rotorcraft Bird Strike Working Group Recommendations to the Aviation Rulemaking Advisory Committee (ARAC)*, Rev. B, May 8, 2019.

Other jurisdictions and/or various (governmental) bodies may have similar requirements, with differences in specificities.

Still, demonstration of compliance to the above-quoted example FAA bird strike regulation requires no bird penetration following a direct impact on the windshield. Conventional methods employed to prevent a bird strike from penetrating through the windshield are by either "bird bagging" or "bird bouncing" methods. Bird bagging is achieved by allowing the windshield to undergo substantial elongation without tearing. During deformation, the windshield will absorb the impact energy. Bird bouncing is known as being more of a brute force approach (heavier) where minimal structural deformations are observed. The energy is dissipated by crushing the bird which requires a very rigid surrounding structure and windshield material. This later approach traditionally uses a tempered glass material for the windscreen, which may be a threat during impact due to shattering and may impede pilot visibility after impact to deflect the bird upon impact. In the recent years, new material (thermoplastic) like polycarbonate have been introduced which allows to further optimize the design as it offers a balance between weight, impact toughness and can undergo substantial deformation without tearing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide, in an aircraft airframe windshield frame, an energy attenuating windshield corner support extending across a corner of the windshield frame. For example, the energy attenuating aircraft windshield corner support may be configured to extend across the corner of the windshield frame from a first eyebrow structure of the windshield frame to a second eyebrow structure of the windshield frame. That is, the energy attenuating aircraft windshield corner support may have a transverse web extending from a first mounting tab, configured to be secured to the first eyebrow structure, to a second mounting tab, configured to be secured to the second eyebrow structure.

The energy attenuating windshield corner support is configured to deform upon an impact to a windshield disposed in the windshield frame. This energy attenuating windshield corner support may be shaped and/or sized to enable, and/or comprised of a material that enables, the aircraft windshield corner support to deform upon the impact to the windshield disposed in the windshield frame, attenuating energy of the impact to the windshield disposed in the windshield frame. To such ends, the aforementioned transverse web may include a longitudinal spine to enable the aircraft windshield corner support to deform upon the impact to the windshield disposed in the windshield frame, attenuating energy of the impact to the windshield disposed in the windshield frame. Additionally, a notch may be defined in the longitudinal spine to enable the aircraft windshield corner support to deform upon the impact to the windshield disposed in the windshield frame, attenuating energy of the impact to the windshield disposed in the windshield frame.

Also, a compressible liner may be disposed between the energy attenuating aircraft windshield corner support and the windshield disposed in the windshield frame.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1A:
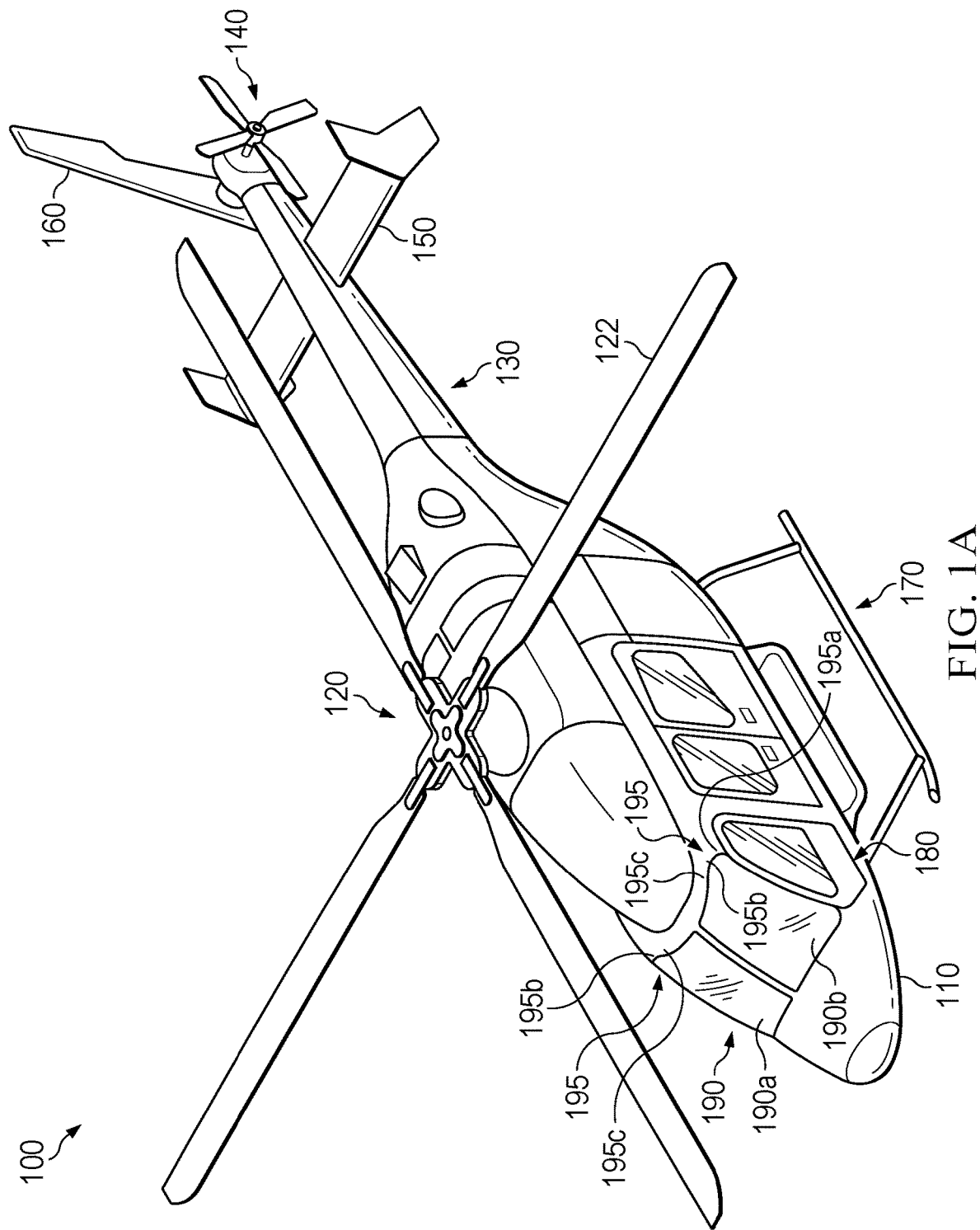
Figure 1B:
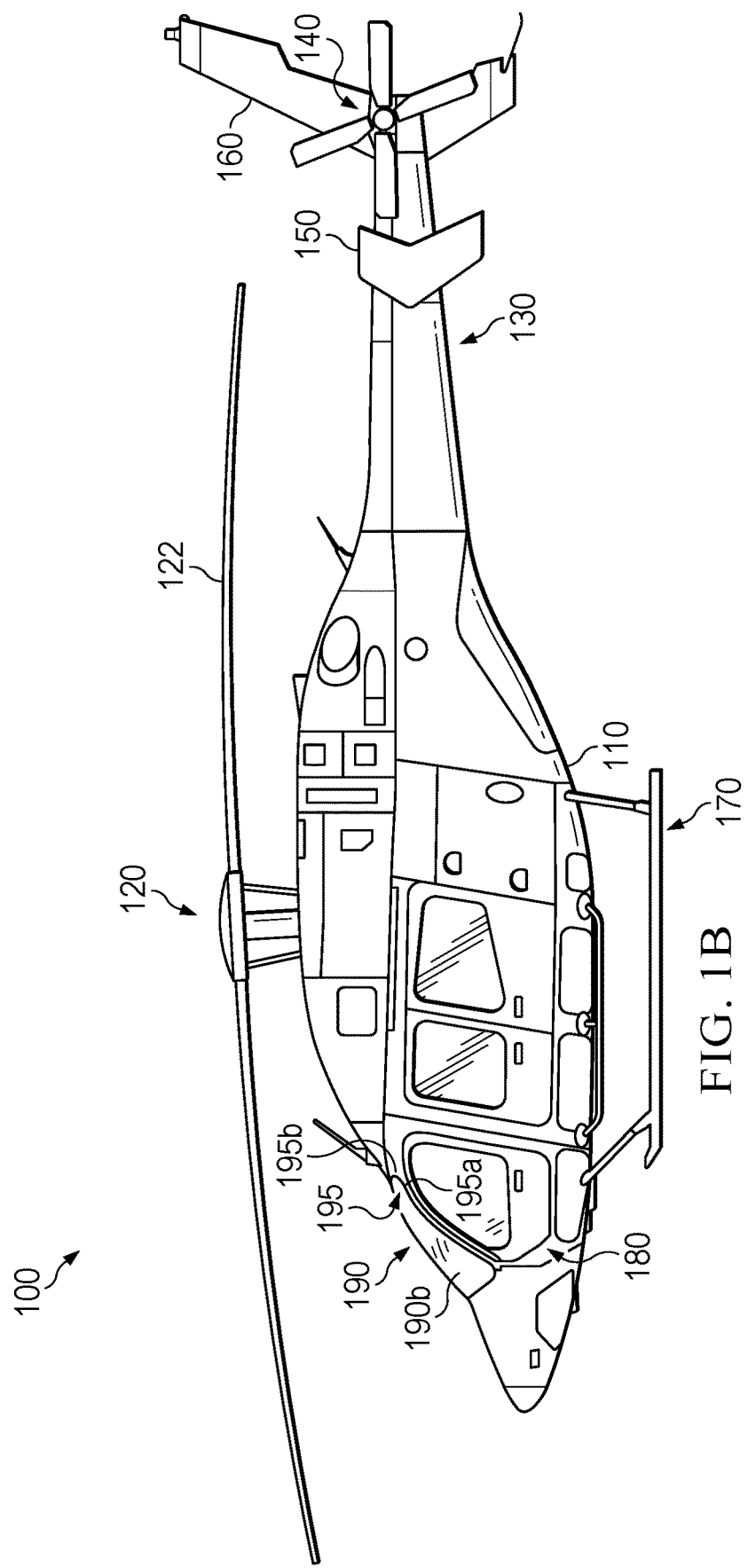
Figure 1C:
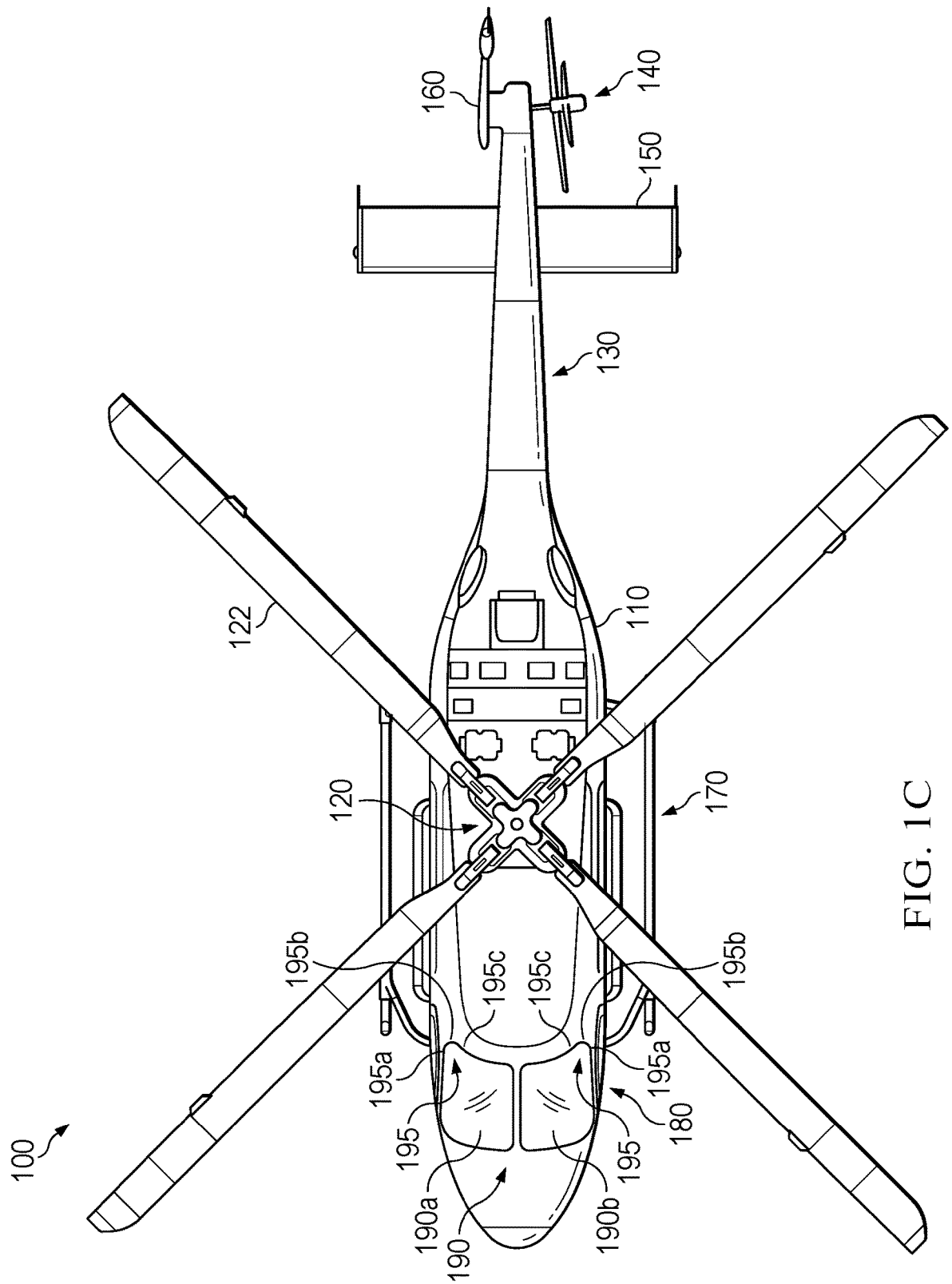
Figure 1D:
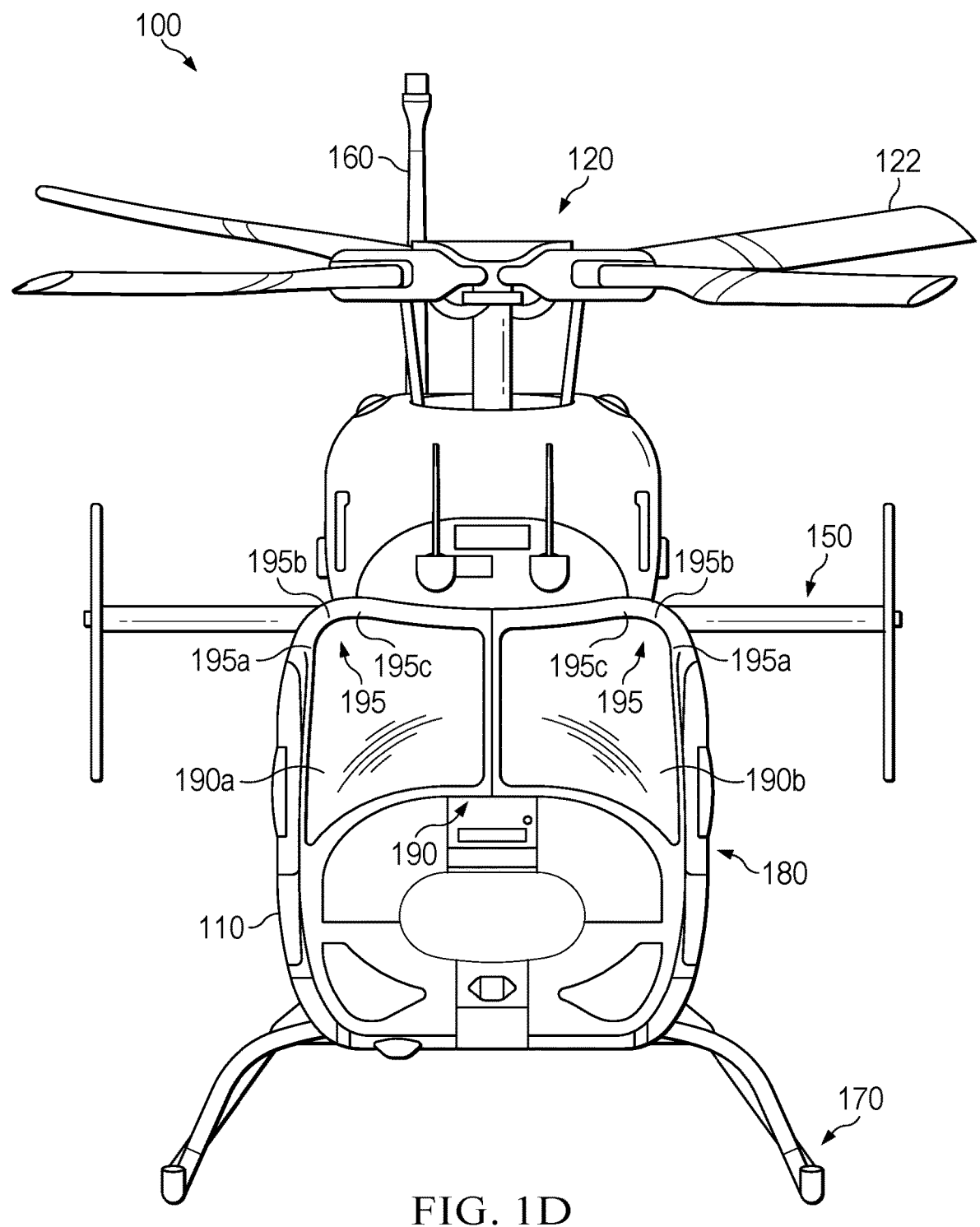
Figure 2:
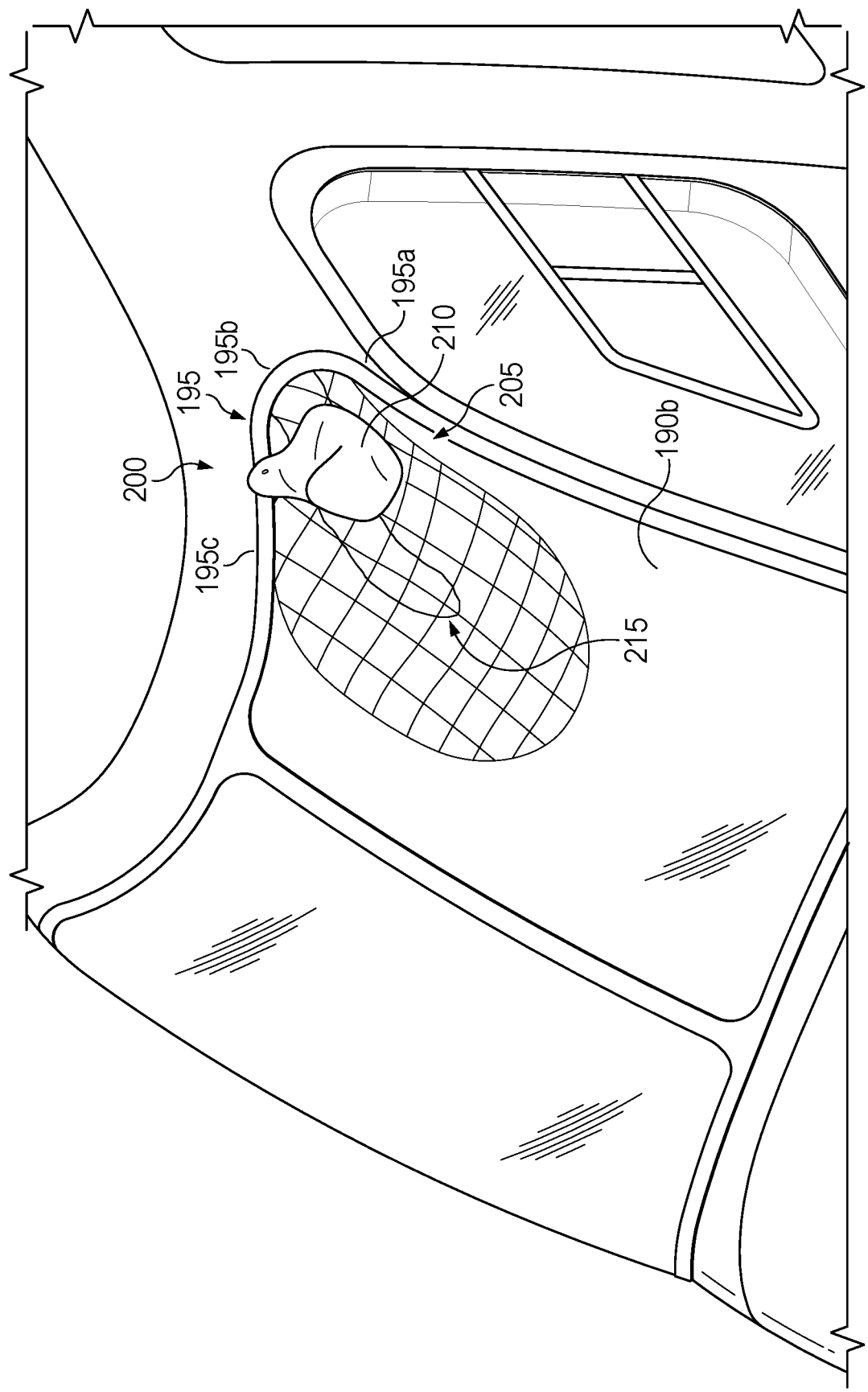
Figure 3:
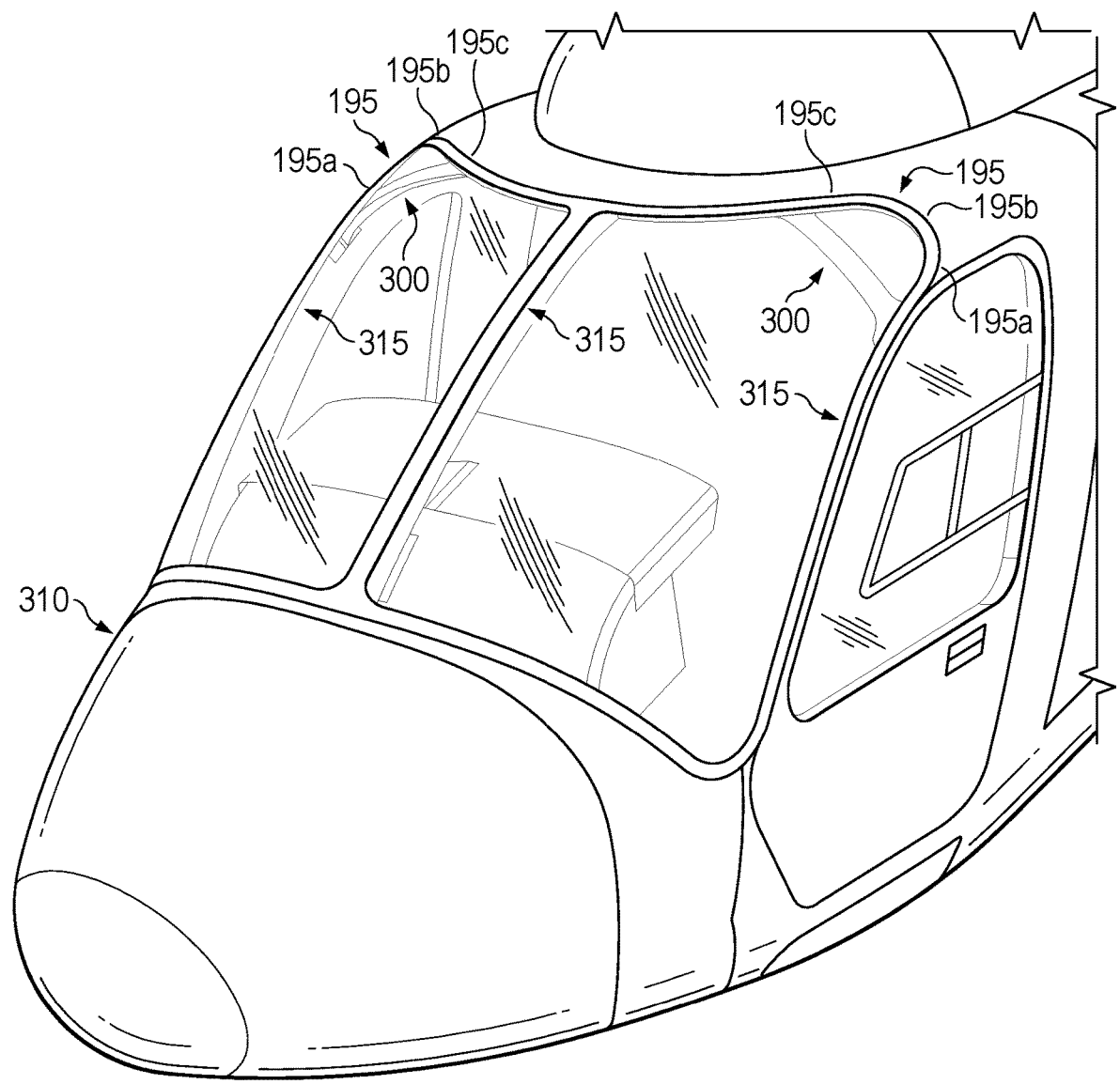
Figure 4:
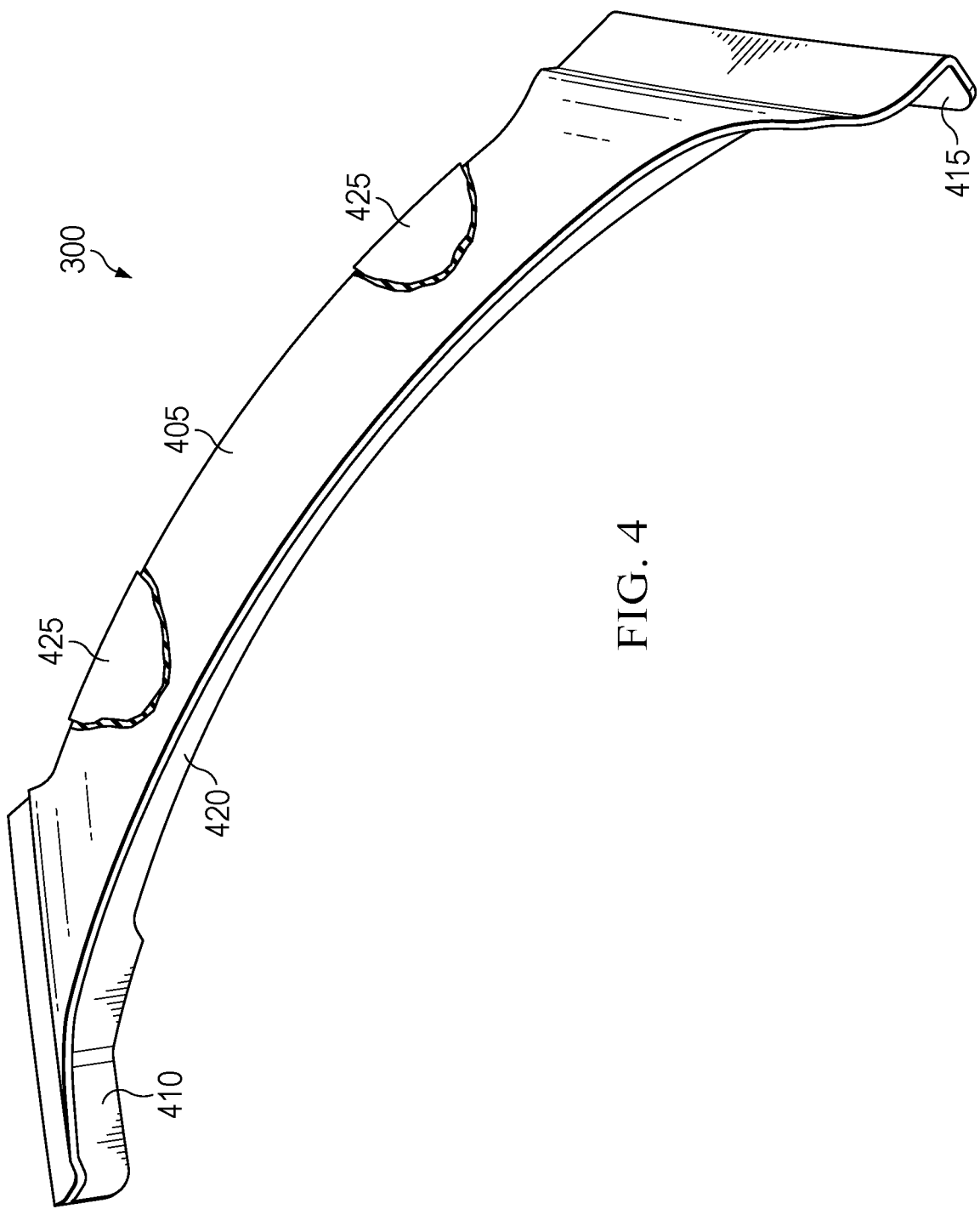
Figure 5:
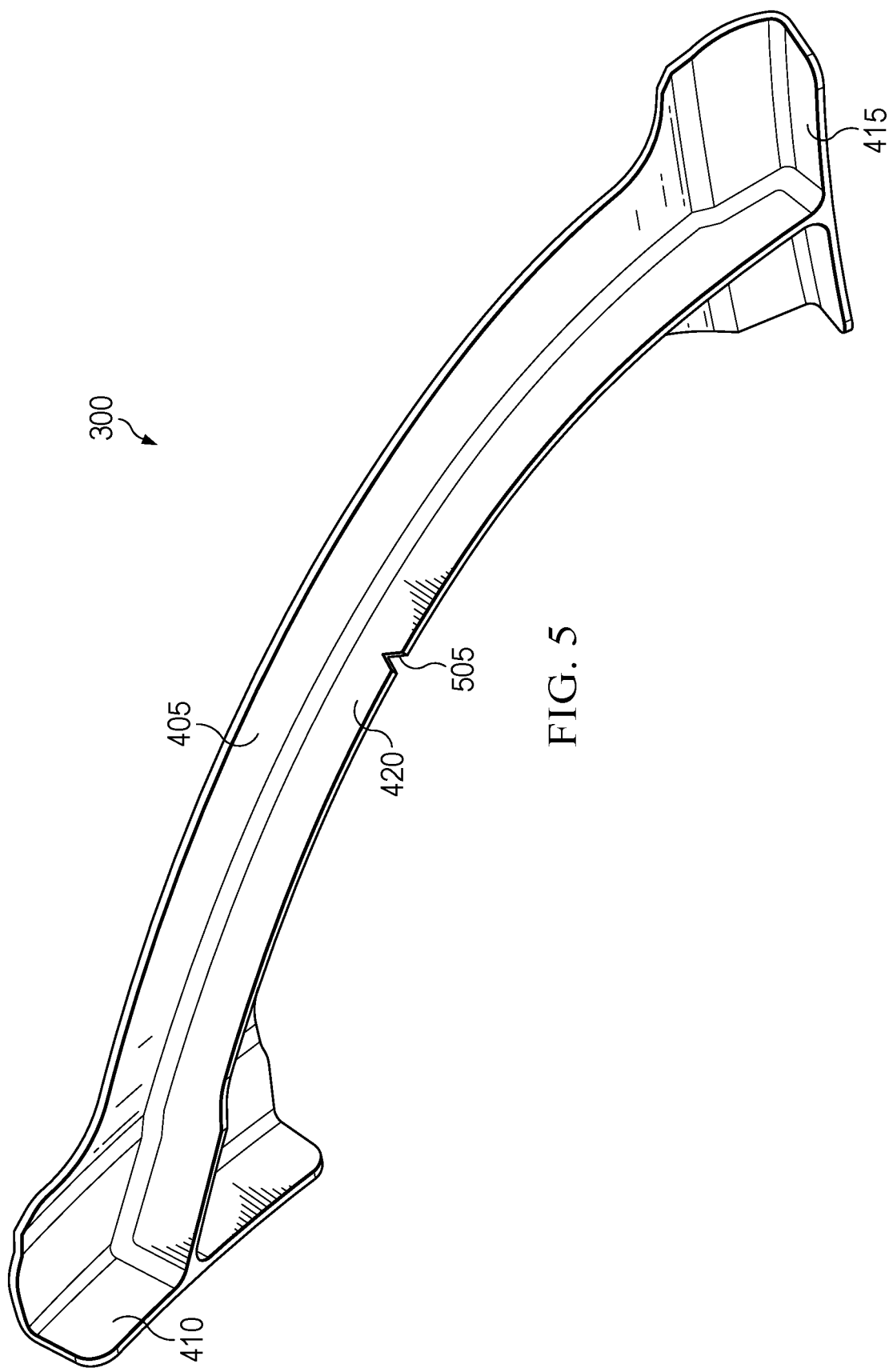
Figure 6:
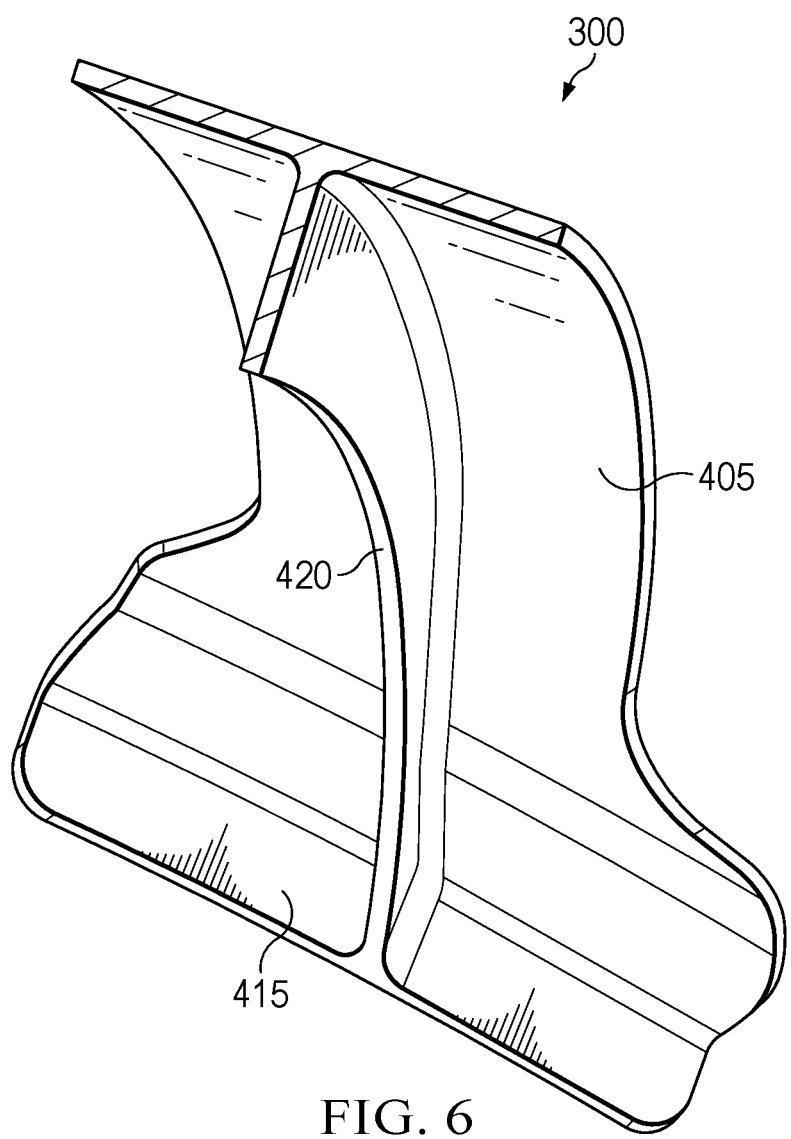
Figure 7:
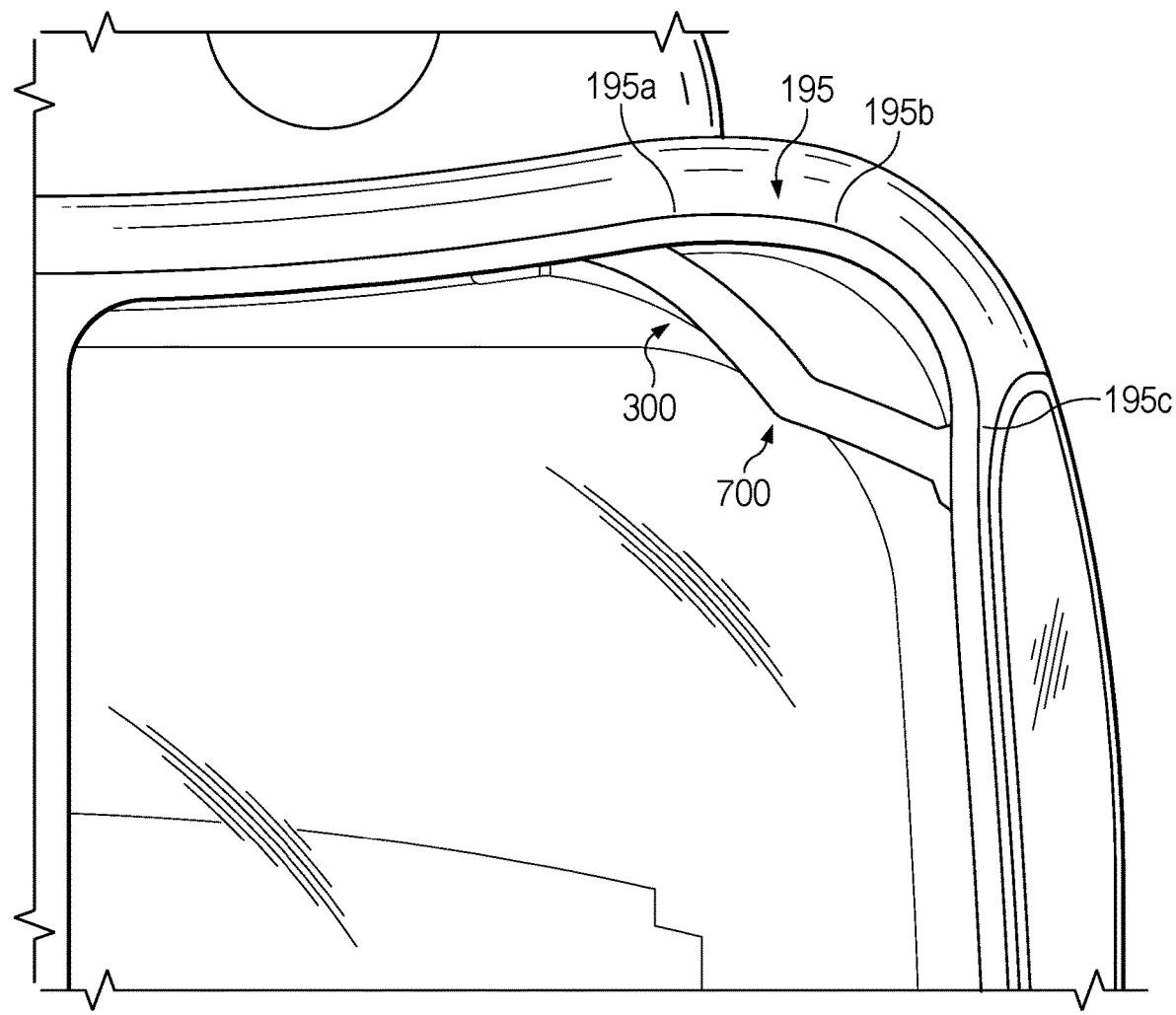

Having thus described the invention in general terms, reference will now be made to the accompanying drawings, which are not necessarily drawn to scale, and which are incorporated in and form part of the specification and in which like numerals designate like parts, illustrate embodiments of the present invention and together with the description, serve to explain the principles of the invention. In the drawings:

FIGS. 1A through 1D depict an aircraft, wherein some embodiments may be employed;

FIG. 2 is an illustration of an example of "bird bagging" as a result of bird strike, according to some examples;

FIG. 3 illustrates incorporation of the present energy attenuating aircraft windshield corner support into an airframe, according to some embodiments;

FIG. 4 is an enlarged perspective view of an example energy attenuating aircraft windshield corner support, according to some embodiments;

FIG. 5 is an enlarged view of an example energy attenuating aircraft windshield corner support from another perspective, according to some embodiments;

FIG. 6 is an enlarged, generally cross-sectional, partially fragmented perspective view of an example energy attenuating aircraft windshield corner support, according to some embodiments; and FIG. 7 illustrates an example of sacrificial deformation of an example energy attenuating aircraft windshield corner support, as a result of a bird strike, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, although embodiments of the present systems and methods may be described below with reference to rotary wing aircraft (a helicopter), embodiments of the present systems and methods may be applicable to various types of aircraft, including not only rotary wing, but also and/or tiltrotor aircraft, fixed wing aircraft, etc. Thus, the present disclosure relates generally to aircraft, more particularly to a windshield assembly for an aircraft, and specifically to energy attenuating windshield corner supports, systems and methods for aircraft, such as rotorcraft (e.g., helicopters).

As a further example, embodiments of the present energy attenuating aircraft windshield corner supports, systems and methods may be tailored for usage in combination with the above-described "bird bagging" method as it is known being more appropriate (e.g., lightest) bird strike mitigation approach for helicopter use. However, the same or other embodiments of the present energy attenuating aircraft windshield corner supports, systems and methods may be compatible with the above-described "bird bouncing" approach.

FIGS. 1A through 1D depict an aircraft, rotorcraft or helicopter 100, wherein some embodiments may be employed. Aircraft 100 includes fuselage or airframe 110, rotor system 120, with rotor blades 122, empennage 130, tail rotor 140, horizontal stabilizer 150, vertical stabilizer 160 and landing gear 170. Fuselage 110 represents the body of aircraft 100 and forms the mechanical structure (airframe) of aircraft 100. Airframe 110 be coupled to rotor system 120 such that rotor system 120 and blades 122 may move fuselage 110 through the air. Rotor system 120 couples torque from an engine (not shown) to blades 122 and causes the blades 122 to rotate. Rotor system 120 may include a flight control system for selectively controlling the pitch of each blade 122 in order to selectively control direction, thrust, and lift of aircraft 100. Empennage 130 represents the tail section (or "tailboom") of aircraft 100 and may house and support components of a trail rotor system 140. Tail rotor 140 may provide thrust in the same direction as the rotation of blades 122 to counter the torque effect created by rotor system 120 and blades 122. Empennage 130 may also include vertical stabilizer 160, or the like extending therefrom, as well vertical stabilizer 160, or the like. Landing gear 170 supports aircraft 100 when aircraft 100 is landing and/or when aircraft 100 is at rest on the ground.

A pilot may manipulate one or more pilot flight control devices in order to achieve controlled aerodynamic flight. Inputs provided by the pilot to the pilot flight control devices may be transmitted mechanically and/or electronically (e.g., via a fly-by-wire flight control system) to flight control systems. Flight control systems may represent devices operable to change the flight characteristics of the aircraft. Examples of flight control systems on aircraft 100 may include the control system operable to change the speed and/or positions (e.g., pitch) of blades 122 and the blades of tail rotor 140. The pilot is typically located in cockpit 180 of aircraft 100 and aircraft 100 may include windshield 190, which may, in some embodiments, be in two pieces, as windshields 190a and 190b, as depicted in FIGS. 1A through 1D. Embodiments of the present supports, systems and methods may equally apply to single piece aircraft windshield.

Windshields 190a, 190b may be any suitable cover or windscreen that protects the pilots in cockpit 180 while allowing visibility to fly aircraft 100. Airframe 110 surrounds and supports windshields 190a, 190b. The windshields 190a, 190b can be a material such as polycarbonate, or another suitable material or combination of materials (laminated). As noted, thermoplastic material, like polycarbonate, offers a balance between weight, impact toughness and can undergo substantial deformation without tearing. The windshields 190a, 190b may have a hard coat, or the like. The windshields 190a, 190b may be directly or indirectly mounted to airframe 110. For example, the windshields 190a, 190b may each be mounted to (on) edging or flange that is formed or mounted to airframe 110, which may include using exterior trim. In some implementations, the windshield 190a, 190b includes approximately 0.12 to 0.45 inch thick polycarbonate material that is attached to airframe edging using fasteners through corresponding holes around the perimeter of the windshield and edging (and trim).

As one of skill in the art would appreciate, "eyebrow" area 195 of windshield 190 has been found to be an example critical location with respect to bird strike penetrations of aircraft windshields. At eyebrow 195, windshield 190, must react to (and with) a significant impact load when a bird strike occurs, where minimal deformation for energy absorption is possible due to the neighboring surrounding structure (boundary condition) 195a though c. Hence, structural deformations are limited and most of the energy must be dissipated by the bird being crushed against the windshield. It is appreciated that notionally speaking, bird bagging requires that the structure "withstand" the loads transmission. The sizing (thickness of the surrounding structure) is creating a rigid boundary condition (especially if made of composite, e.g., not much permanent deformation before failure, thus no energy absorption).

FIG. 2 is an illustration of example "bird bagging" 200 as a result of bird strike 205. As noted above, methods employed to prevent a bird strike from penetrating through the windshield of an aircraft include bird bagging methods. Bird bagging is achieved by allowing the windshield to undergo substantial elongation without tearing. During deformation, the windshield will absorb the impact energy. Consistent with FIG. 2, eyebrow 195 of windshield 190 experiences a significant impact load when bird strike 205 occurs. Neighboring surrounding fuselage eyebrow structure 195a though c creates a boundary condition where minimal deformation for energy absorption by windshield 190 (in eyebrow area 195) is possible. Hence, most of the energy from bird strike 205 must be dissipated by bird 210 being crushed against windshield 190, which may result in windshield failure (crack) 215, which may in turn lead to, or itself be, windshield penetration (particularly at relatively cold temperatures).

As noted, embodiments of the present systems and methods relate to a windshield assembly for an aircraft, and specifically relate to energy attenuating windshield corner supports, systems and methods for aircraft, such as rotorcraft. In accordance with embodiments of the present systems and methods improve aircraft windshield energy absorption without an increase to windshield (uniform) thickness and/or without splitting the windshield into subelements. Splitting the windshield into sub-elements, such as splitting the windshield across "eyebrow," 195 may be more detrimental, as the split may "catch" the bird during impact causing premature failure of the windshield. For example, a windshield, split at eyebrow 195, into a main windshield and an eyebrow windshield panel may experience a bird strike failure mode that is amplified at the joint, between the main windshield and the windshield eyebrow panel, such as due to migration of the bird's body to the joint, resulting in penetration of the windshield. This would result in failure of the aircraft/windshield to meet regulations such as enumerated above. Structure 195 is not only dimensioned for bird strike but also for air and crash loads. For example, neighboring surrounding fuselage eyebrow structure 195a though c creates a boundary condition where minimal deformation for energy absorption by the eyebrow windshield panel exacerbates the windshield failure mode and penetration.

In contrast, embodiments of the present systems and methods, an energy attenuating windshield corner support extending across a corner of the windshield frame is configured to deform upon an impact to a windshield disposed in the windshield frame. This energy attenuating windshield corner support may be shaped and/or sized to enable, and/or comprised of a material that enables, the aircraft windshield corner support to deform upon the impact to the windshield disposed in the windshield frame, attenuating energy of the impact to the windshield disposed in the windshield frame, such as, without the energy attenuating aircraft windshield corner support detaching from the windshield frame.

As noted, embodiments of the present energy attenuating aircraft windshield corner supports, systems and methods may be tailored for usage in combination with the above-described "bird bagging" method as it is known being more appropriate (e.g., lightest) bird strike mitigation approach for helicopter use. However, the same or other embodiments of the present energy attenuating aircraft windshield corner supports, systems and methods may be compatible with the above-described "bird bouncing" approach. With respect to the bird bouncing approach, rather than absorbing energy transmitted from the windshield to the structure and providing additional support, the present corner support helps the surrounding structure absorb the energy. In other words, bird bagging facilitates use of a thin plastic sheet that deforms as an aircraft windshield through placement of the energy attenuating corner support to provide localized reinforcement. Whereas, the bird bouncing approach employs a thick rigid material (e.g., glass) as the aircraft windshield, which will not deform, and hence will not absorb energy. In such implementations, the energy attenuating corner support (strap) is used to rigidify the surrounding structure, so that during the impact, the structure will not deform significantly enough to allow the windshield to "pop-out" of the airframe. In sum, the energy attenuating corner support, in bird bagging, absorbs aircraft windshield energy and prevents tear out and/or excessive aircraft windshield displacement, while the energy attenuating corner support, in bird bouncing, absorbs surrounding structure energy.

FIG. 3 illustrates incorporation of example energy attenuating aircraft windshield corner support 300 into airframe 310, according to example embodiments. Incorporation of energy attenuating aircraft windshield corner support 300 into airframe 310, generally across eyebrow area 195, of windshield frame 315, reduces windshield deflection during a bird strike and avoids the phenomenon of "catching" the bird in the eyebrow corner which is detrimental to the windshield (i.e., minimizes negative effects of the above-described "bird bagging" phenomenon), enabling the structure to withstand the bird bagging loads transmission. Energy attenuating aircraft windshield corner support 300 is a sacrificial part that allows use of relatively thinner windshield material and locally improves impact toughness of the windshield, hence minimizing any weight penalty for compliance with bird strike regulations, or the like. In accordance with embodiments of the present systems and methods, "energy attenuating" as used herein refers to the surrounding structure (e.g., 195a-c) rather than the windshield material itself. For example, energy attenuating is achieved by the aircraft windshield itself, because the aircraft windshield absorbs impact energy by deformation. In accordance with embodiments of the present systems and methods, the energy attenuating corner support greatly helps in absorbing the energy and also has the benefit of "limiting" the deformation up to a point where the plastic of the aircraft windshield can no longer tolerate and would fail (e.g., tear).

FIG. 4 is an enlarged perspective view of example energy attenuating aircraft windshield corner support 300, FIG. 5 is an enlarged view of example energy attenuating aircraft windshield corner support 300 from another perspective, and FIG. 6 is an enlarged, generally cross-sectional, partially fragmented view of example energy attenuating aircraft windshield corner support 300, according to some embodiments. As noted, energy attenuating aircraft windshield corner support 300 is configured to extend across a corner of an aircraft windshield frame (315) and deform upon an impact to a windshield (190) disposed in the windshield frame. Further, in various embodiments, energy attenuating aircraft windshield corner support 300 is configured to so deform upon an impact to the windshield (190) disposed in the windshield frame without energy attenuating aircraft windshield corner support 300 detaching from the windshield frame. FIG. 6 illustrates such sacrificial deformation of embodiment 300 of the present energy attenuating aircraft windshield corner support, as a result of a bird strike.

To such ends, energy attenuating aircraft windshield corner support 300 may be shaped and/or sized to enable the aircraft windshield corner support to deform upon the impact to the windshield (190) disposed in the windshield frame, attenuating energy of the impact to the windshield disposed in the windshield frame, such as, without the energy attenuating aircraft windshield corner support detaching from the windshield frame. As noted, energy attenuating aircraft windshield corner support 300 is configured to extend across the corner of the windshield frame (generally) from a first eyebrow structure (195a) of the windshield frame (315) to a second eyebrow structure (195c) of the windshield frame (315). To provide energy attenuation support 300 may be disposed, in accordance with some embodiments, in contact with windshield 190, or, in accordance with some other embodiments, closely spaced apart from the windshield. In either case, upon an impact, such as a bird strike described above, with reference to FIG. 2, in particular, windshield 190 may contact support 300 such that the support attenuates energy of the impact to the windshield (without the energy attenuating windshield corner support detaching from the windshield frame).

Thus, with attention directed to FIGS. 4 through 6, in various embodiments, transverse web 405 extends from first mounting tab 410, configured to be secured to the first eyebrow structure (195a), to second mounting tab 415, configured to be secured to the second eyebrow structure (195c). So, in some embodiments, to deform upon the impact to the windshield (190) disposed in the windshield frame (315), attenuating energy of the impact to the windshield (without corner support 300 detaching from the windshield frame) the transverse web may have, define and/or form longitudinal "spine" 420, along the transverse web. Spine 420 enables energy attenuating aircraft windshield corner support 300 to deform upon impact to the windshield, attenuating energy of the impact to the windshield, such as, without the corner support detaching from the windshield frame (315). Being relatively "normal" to a typical impact vector, spine 420 is a member of energy attenuating corner support 300 that, in accordance with various embodiments, will provide a significant amount, if not most, of the energy absorption. Spine 420 is dimensioned to not be strong enough to withstand the impact and not deform, which may be more detrimental to the windshield. For example, iterative loop analysis may be used to determine optimal dimensions of that spine for the geometry of a subject aircraft (airframe) to allow the spine to be just sturdy enough to absorb just enough energy without causing any premature failure of the aircraft windshield.

Additionally, or alternatively, in some embodiments a notch or the like (505, shown only in FIG. 5) may be defined in spine 420 to act as a "fuse" in the spine. Notch 505 may be defined in the spine, at a specific location, to either control failure of energy attenuating corner support 300, such that the support fails at a (that) specific location, so as to not be a threat to the pilots. Additionally, or alternatively, notch 505 may "fuse" energy attenuating corner support 300 (and/or spine 420) in such a manner as to make sure it stops absorbing energy at a specific moment. In accordance with the foregoing, notch 505 weakens spine 420 (and thereby energy attenuating corner support 300), of otherwise predisposes or enables (e.g., provides a (sacrificial) failure point or mechanism).

In accordance with embodiments of the present supports, systems and methods, rather that energy attenuating corner support 300 staying attached following an impact (bird strike), the energy attenuating corner support may detach from one end during failure, or failure of the energy attenuating corner support may be controlled have it fail in in the middle of the part so each "half" will not detach from the windshield frame, such as through failure at notch 505 described above.

Additionally, or alternatively, energy attenuating aircraft windshield corner support 300 may be formed (e.g., extruded, bent, stamped, etc.) from a material that enables, or at least facilitates deformation of the corner support upon the impact to the windshield (190) disposed in the windshield frame (315), attenuating the energy of the impact to the windshield. However, the material may be of sufficient strength to afford the corner support sufficient strength to avoid detaching from the windshield frame.

In these and other embodiments, energy attenuating aircraft windshield corner support 300 may not only be shaped and/or sized to enable, but also comprised of a material that enables, the aircraft windshield corner support to deform upon an impact to the windshield (190) disposed in the windshield frame (315), so as to attenuate the energy of the impact to the windshield, (without the corner support detaching from the windshield frame).

Additionally, energy attenuating aircraft windshield corner support 300 may include a (resilient) compressible "gasket" or liner 425 (shown partially fragmented in FIG. 4 disposed between the energy attenuating aircraft windshield corner support and the windshield disposed in the windshield frame. This liner may be secured to a windshield facing surface 320 of the energy attenuating windshield corner support (as shown), or otherwise disposed between support web 405 and the windshield disposed in windshield frame. As noted, in some embodiments, support 300 may be disposed in contact with windshield 190, thereby, it may be the liner disposed in contact with the windshield, such that support 300 is closely spaced apart from the windshield.

FIG. 7 illustrates sacrificial deformation 700 of present energy attenuating aircraft windshield corner support 300, as a result of a bird strike, according to example embodiments. As noted, energy attenuating aircraft windshield corner support 300 is a sacrificial part. Energy attenuating aircraft windshield corner support 300 is sized, and comprised of materials, so as to deform upon impact without detaching, and creating a foreign object debris (FOD) threat. Likewise, the support afforded by energy attenuating aircraft windshield corner support 300 to the windshield, during a bird strike, reduces windshield deflection during a bird strike and not only avoids the phenomenon of "catching" the bird in the eyebrow corner, but also reduces the likelihood of windshield failure, support 300 preferably deforms, such as in a manner as shown, rather than breaking and creating a FOD threat, in that manner.

While support may be shaped and sized as illustrated, it may take other shapes, such as, by way of example, a U-shaped channel facing away from, or in other embodiments toward, the windshield, a rectangular cross-section, hollow, etc. formed in any number of manners, such as bent from sheet metal, extruded, machined, etc., from any number of materials, or combination of materials, such a metals (sheet steel, aluminum, etc.), polymers, etc. Advantageously a support made of metal will, in accordance with various embodiments, absorb energy in a manner conducive to the present embodiments of an energy attenuating windshield corner support, system and method for aircraft, such as during "tear-out," in their plasticity phase, stretching out (such as, for example, in a manner shown in FIG. 7). While support 300 is shown disposed in upper corner of windshield frame 315 in the accompanying drawings, embodiments of the present energy attenuating windshield corner supports, systems and methods for aircraft may be disposed in another corner of an aircraft windshield, or other location, suspectable to "catching" a bird during a bird strike.

In accordance with the foregoing, embodiments of the present energy attenuating aircraft windshield corner support (300) locally increases impact toughness of an aircraft windshield (190) compared to a uniform windshield thickness increase, which is a conventional solution to bird strike aircraft windshield penetration, but results in a severe weight penalty. Thereby, embodiments of the present supports, systems and methods provide a lightweight solution to meet bird strike regulations.

In some embodiments, corner support 300, or the like may be used as a means to separate the windshield into two pieces. That is, the support 300 may be used in conjunction with a split windshield, such as described above, to alleviate bird strike windshield penetration (such as also described above). In such embodiments, with a windshield split at eyebrow 195, a main windshield and an eyebrow windshield panel may each be fastened to the support.

Reference is made herein to "configuring" an apparatus or an apparatus "configured to" perform some task(s) and/or operation(s). It should be understood that this may include selecting structure and/or materials such that the apparatus is physically designed to perform the specified task(s) and/or operation(s).

Although the present invention and its advantages have been described in detail, it should be understood that various changes, substitutions and alterations can be made herein without departing from the spirit and scope of the invention as defined by the appended claims. For example, aircraft 100 is illustrated as a Bell Helicopter, Model 429, or the like, which is a model helicopter particularly well adapted to employ embodiments of the present supports systems and methods. However, the scope of the present application is not intended to be limited to the particular implementations, embodiments of the process, machine, manufacture, composition of matter, means, methods and steps described in the specification. Thus, embodiments of the present supports, systems and methods may be employed in any number of aircraft. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An energy attenuating aircraft windshield corner support extending transversely across two outer corner areas of an aircraft windshield frame, the aircraft windshield frame comprising an apex corner area surrounded on each side by the two outer corner areas, wherein the energy attenuating aircraft windshield corner support is configured distally from the apex corner area, the energy attenuating aircraft windshield corner support configured adjacent to and underneath a single-piece windshield disposed in the windshield frame, the single-piece windshield extends continuously across the windshield corner support, the energy attenuating aircraft windshield corner support configured to deform upon an impact to the windshield.

2. The energy attenuating aircraft windshield corner support of claim 1, wherein the energy attenuating aircraft windshield corner support is shaped and/or sized to enable the aircraft windshield corner support to deform upon the impact to the windshield disposed in the windshield frame, attenuating energy of the impact to the windshield disposed in the windshield frame.

3. The energy attenuating aircraft windshield corner support of claim 1, wherein the energy attenuating aircraft windshield corner support further comprises a transverse web extending from a first mounting tab, configured to be secured to a first of the outer corner areas, to a second mounting tab, configured to be secured to a second of the outer corner areas.

4. The energy attenuating aircraft windshield corner support of claim 3, wherein the transverse web comprises a longitudinal spine configured to enable the aircraft windshield corner support to deform upon the impact to the windshield disposed in the windshield frame, attenuating energy of the impact to the windshield disposed in the windshield frame.

5. The energy attenuating aircraft windshield corner support of claim 4, further comprising a notch defined in the longitudinal spine, the notch configured to enable the aircraft windshield corner support to deform upon the impact to the windshield disposed in the windshield frame, attenuating energy of the impact to the windshield disposed in the windshield frame.

6. The energy attenuating aircraft windshield corner support of claim 1, wherein the energy attenuating aircraft windshield corner support is comprised of a material that enables the aircraft windshield corner support to deform upon the impact to the windshield disposed in the windshield frame, attenuating energy of the impact to the windshield disposed in the windshield frame.

7. The energy attenuating aircraft windshield corner support of claim 1, wherein the energy attenuating aircraft windshield corner support is shaped, sized, and comprised of a material that enables, the aircraft windshield corner support to deform upon the impact to the windshield disposed in the windshield frame, attenuating energy of the impact to the windshield disposed in the windshield frame.

8. The energy attenuating aircraft windshield corner support of claim 1, further comprising a compressible liner disposed between the energy attenuating aircraft windshield corner support and the windshield disposed in the windshield frame.

9. A method for attenuating energy of an impact to an aircraft windshield comprising mounting an energy attenuating windshield corner support longitudinally across two outer corner areas of an aircraft windshield frame, the aircraft windshield frame comprising an apex corner area surrounded on each side by the two outer corner areas, wherein the energy attenuating aircraft windshield corner support is configured distally from the apex corner area, the energy attenuating aircraft windshield corner support configured adjacent to and underneath a single-piece windshield disposed in the windshield frame, the single-piece windshield extends continuously across the windshield corner support, the energy attenuating windshield corner support deforming upon an impact to a windshield disposed in the windshield frame, attenuating energy of the impact to the windshield.

10. The method of claim 9, further comprising forming the energy attenuating windshield corner support with a shape and/or size that causes the aircraft windshield corner support to deform upon the impact to the windshield disposed in the windshield frame, attenuating the energy of the impact to the windshield disposed in the windshield frame.

11. The method of claim 9, further comprising:
forming the energy attenuating windshield corner support with a transverse web extending from a first mounting tab to a second mounting tab;
configuring the first mounting tab to be secured to a first of the outer corner areas;
configuring the second mounting tab to be secured to a second of the outer corner areas; and
enabling the aircraft windshield corner support to deform upon the impact to the windshield disposed in the windshield frame and attenuate energy of the impact to the windshield disposed in the windshield frame by forming a longitudinal spine along the transverse web.

12. The method of claim 11, further comprising enabling the aircraft windshield corner support to deform upon the impact to the windshield disposed in the windshield frame and attenuate energy of the impact to the windshield disposed in the windshield frame using a notch formed in the longitudinal spine.

13. The method of claim 9, further comprising forming the energy attenuating windshield corner support from a material that enables the aircraft windshield corner support to deform upon the impact to the windshield disposed in the windshield frame, attenuating energy of the impact to the windshield disposed in the windshield frame.

14. The method of claim 9, further comprising forming the energy attenuating windshield corner support with a shape, size, and comprising a material to enable the aircraft windshield corner support to deform upon the impact to the windshield disposed in the windshield frame, attenuating energy of the impact to the windshield disposed in the windshield frame.

15. The method of claim 9, further comprising disposing a compressible liner between the energy attenuating windshield corner support and the windshield disposed in the windshield frame.

16. An aircraft comprising: an airframe comprising: a windshield frame comprising an apex corner area surrounded on each side by two outer corner areas; and an energy attenuating windshield corner support extending obliquely across the two outer corner areas of the windshield frame, the energy attenuating aircraft windshield corner support configured adjacent to and underneath a single-piece windshield disposed in the windshield frame, the single-piece windshield extends continuously across the windshield corner support, wherein the energy attenuating aircraft windshield corner support is configured distally from the apex corner area.

17. The aircraft of claim 16, wherein the energy attenuating windshield corner support is configured to deform upon an impact to a windshield disposed in the windshield frame.

18. The aircraft of claim 16 wherein the energy attenuating windshield corner support is shaped and/or sized to enable, and/or comprised of a material that enables, the aircraft windshield corner support to deform upon the impact to the windshield disposed in the windshield frame, attenuating energy of the impact to the windshield disposed in the windshield frame.

* * * * *